US00RE39425E

(19) United States
(12) Reissued Patent
Taylor

(10) Patent Number: US RE39,425 E
(45) Date of Reissued Patent: Dec. 12, 2006

(54) OXYGEN-FUEL BURNER WITH INTEGRAL STAGED OXYGEN SUPPLY

(75) Inventor: Curtis L. Taylor, Muncie, IN (US)

(73) Assignee: Maxon Corporation, Muncie, IN (US)

(21) Appl. No.: 08/954,291

(22) Filed: Oct. 17, 1997

Related U.S. Patent Documents

Reissue of:
(64) Patent No.: 5,458,483
Issued: Oct. 17, 1995
Appl. No.: 08/163,424
Filed: Dec. 8, 1993

U.S. Applications:

(63) Continuation-in-part of application No. 08/092,008, filed on Jul. 15, 1993, now Pat. No. 5,431,559.

(51) Int. Cl.
*F23M 9/00* (2006.01)

(52) U.S. Cl. ..... 431/350; 431/9; 431/115; 431/351

(58) Field of Classification Search ..... 431/350, 431/159, 182, 187, 8, 10, 348, 190, 166, 431/167, 351, 188, 164, 165, 69, 76
See application file for complete search history.

(56) References Cited

U.S. PATENT DOCUMENTS

| | | | | | |
|---|---|---|---|---|---|
| 1,118,506 | A | * | 11/1914 | Melas | 431/186 |
| 1,304,402 | A | * | 5/1919 | Spire | |
| 2,368,370 | A | * | 1/1945 | Maxon, Jr. | |
| 2,390,056 | A | * | 12/1945 | Cleaver et al. | |
| 2,583,736 | A | * | 1/1952 | Hess | 432/222 |
| 2,952,307 | A | * | 9/1960 | Schramm et al. | |
| 2,986,206 | A | * | 5/1961 | Boelsma | |
| 3,132,683 | A | * | 5/1964 | Meyer | 431/188 |
| 3,168,131 | A | * | 2/1965 | Gross | 431/354 |
| 3,244,220 | A | * | 4/1966 | Kloecker | 431/284 |
| 3,418,062 | A | * | 12/1968 | Hovis et al. | |
| 3,514,244 | A | * | 5/1970 | Meyer et al. | 431/164 |
| 3,574,508 | A | * | 4/1971 | Rothhaar et al. | 431/158 |
| 4,004,875 | A | * | 1/1977 | Zink et al. | 431/187 |
| 4,181,491 | A | * | 1/1980 | Hovis | 431/187 |
| 4,230,445 | A | * | 10/1980 | Janssen | 431/116 |
| 4,351,632 | A | * | 9/1982 | Nagai | 431/183 |
| 4,439,137 | A | | 3/1984 | Suzuki et al. | |
| 4,583,936 | A | | 4/1986 | Krieger | |
| 4,690,635 | A | * | 9/1987 | Coppin | 431/187 |
| 4,986,748 | A | * | 1/1991 | Brown et al. | 431/188 |
| 5,092,760 | A | * | 3/1992 | Brown et al. | 431/10 |
| 5,240,410 | A | * | 8/1993 | Yang et al. | 431/284 |
| 5,263,849 | A | * | 11/1993 | Irwin et al. | 431/6 |
| 5,269,679 | A | * | 12/1993 | Syska et al. | 431/9 |
| 5,431,559 | A | * | 7/1995 | Taylor | 431/164 |

FOREIGN PATENT DOCUMENTS

| | | | | |
|---|---|---|---|---|
| GB | 1107703 | * | 3/1968 | 431/350 |
| JP | 352014227 | * | 2/1977 | 431/10 |
| JP | 52-32132 | * | 3/1977 | 431/10 |

(Continued)

OTHER PUBLICATIONS

North American Combustion Handbook, A Basic Reference on the Art and Science of Industrial Heating with Gaseous and Liquid Fuels, vol. 1: Combustion, Fuels, and Stoichiometry, Heat Transfer, Fluid Flow, Third Edition, "Oxygen Enrichment", pp. 76–79.*
Combustion Technology Manual, Fourth Edition, 1988, "Oxygen–Enriched and Oxy–Fuel Combustion", pp. 316–327.*

*Primary Examiner*—Carl D. Price
(74) *Attorney, Agent, or Firm*—Barnes & Thornburg LLP

(57) ABSTRACT

A burner assembly is provided for combining oxygen and fuel to produce a flame. The burner assembly includes a burner block formed to include a flame chamber having inlet and outlet openings, a bypass structure for conducting oxygen outside of the flame chamber to the outlet opening of the flame chamber and structure for discharging fuel into the flame chamber formed in the burner block.

57 Claims, 5 Drawing Sheets

FOREIGN PATENT DOCUMENTS

| | | | | |
|---|---|---|---|---|
| JP | 352140920 | * | 11/1977 | ..... 431/10 |
| JP | 354054340 | * | 4/1979 | ..... 431/10 |
| JP | 354055825 | * | 5/1979 | ..... 431/10 |
| JP | 354072523 | * | 6/1979 | ..... 431/10 |
| JP | 55-92804 | * | 7/1980 | ..... 431/10 |
| JP | 56-34006 A | | 4/1981 | |
| JP | 356082306 | * | 7/1981 | ..... 431/10 |
| JP | 01-167502 | * | 3/1989 | ..... 431/10 |
| JP | 401070606 | * | 3/1989 | ..... 431/10 |

* cited by examiner

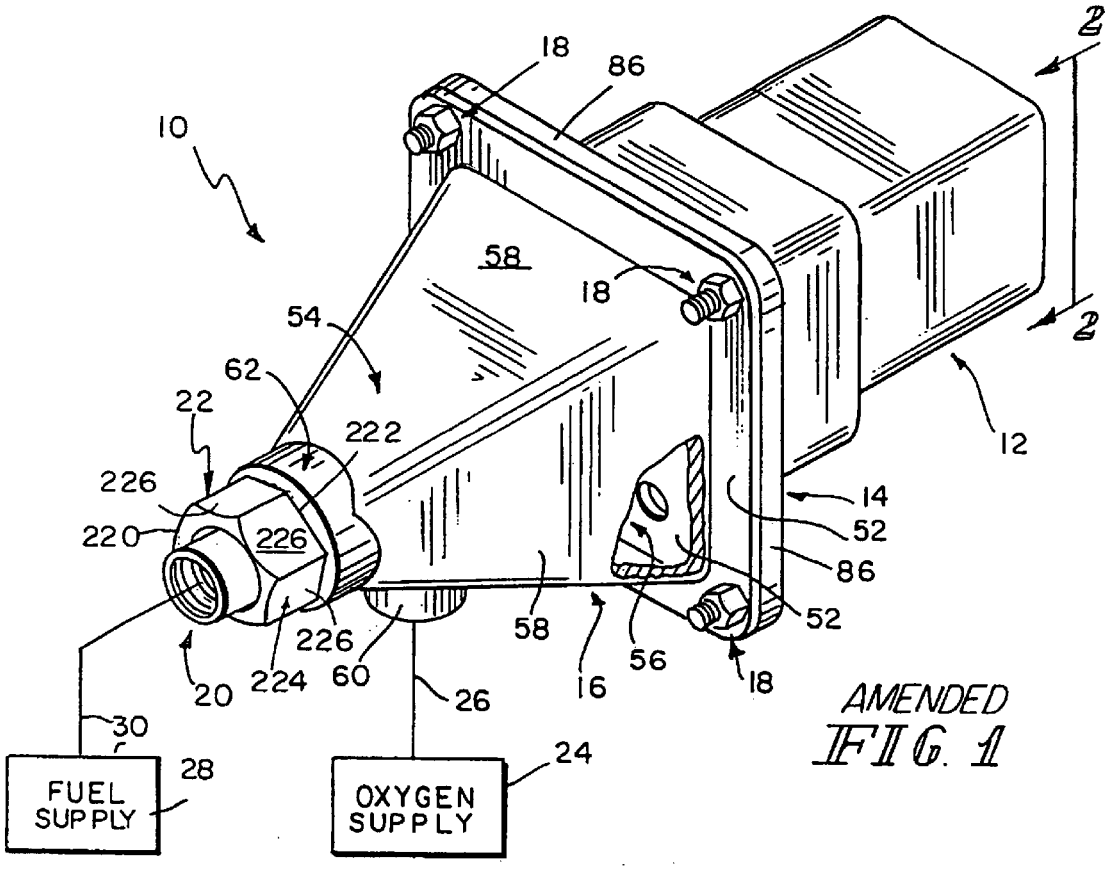
AMENDED
FIG. 1

AMENDED FIG. 3A

AMENDED FIG. 7

OXYGEN-FUEL BURNER WITH INTEGRAL STAGED OXYGEN SUPPLY

Matter enclosed in heavy brackets [ ] appears in the original patent but forms no part of this reissue specification; matter printed in italics indicates the additions made by reissue.

BACKGROUND AND SUMMARY OF THE INVENTION

This application is a continuation-in-part of application Ser. No. 08/092,008, filed Jul. 15, 1993, now U.S. Pat. No. 5,431,559, issued on Jul. 11, 1995.

The present invention relates to burner assemblies, and particularly to oxygen-fuel burner assemblies. More particularly, the present invention relates to a burner having a fuel-delivery system and a staged oxygen-supply system.

One challenge facing the burner industry is to design an improved burner that produces lower nitrogen oxide emissions during operation than conventional burners. Typically, an industrial burner discharges a mixture of fuel and either air or oxygen. A proper ratio of fuel and air is established to produce a combustible fuel and air mixture. Once ignited, this combustible mixture burns to produce a flame that can be used to heat various products in a wide variety of industrial applications. Combustion of fuels such as natural gas, oil, liquid propane gas, low BTU gases, and pulverized coals often produce several unwanted pollutant emissions such as nitrogen oxides ($NO_x$), carbon monoxide (CO), and unburned hydrocarbons (UHC).

Burners that combine oxygen with an atomized fuel and oxygen mixture to produce a combustible mixture are known. See, for example, U.S. Pat. No. 5,092,760 to Brown and Coppin. Burners having oxygen-enrichment systems are also known as disclosed in the IHEA Combustion Technology Manual, Fourth Edition (1988), pp. 320–21, published by The Industrial Heating Equipment Association of Arlington, Va.

Burners were developed to burn a mixture of fuel and pure oxygen in an attempt to lower the amount of $NO_x$ produced during combustion. Atmospheric combustion air contains approximately 79% nitrogen ($N_2$) and pure oxygen contains no nitrogen. It has been observed that the higher flame temperatures brought on by burning a mixture of fuel and pure oxygen has caused the conversion of fuel-bound $N_2$ into $NO_x$ to increase. Additionally, new technology that allows on-site generation of combustion oxygen has been developed by oxygen suppliers. This on-site generated oxygen is not pure and can contain as much as 10% nitrogen by volume. This additional nitrogen, in contact with the high-temperature oxy-fuel flame, represents an additional source of $NO_x$ emissions.

A burner assembly designed to burn fuel more completely using a lower flame temperature would lead to lower nitrogen oxide emissions. What is needed is a burner assembly that is able to burn a fuel and oxygen mixture without generating a lot of unwanted nitrogen oxide emissions. A staged oxygen burner designed to direct oxygen to various regions of a flame produced by the burner using modular components and easily manufactured precision oxygen-flow metering apparatus would lead to lower nitrogen oxide emissions and thus be a welcomed improvement over conventional burner assemblies. Ideally, an improved staged oxygen burner would be configured to accept various fuel nozzles to permit a user to burn either fuel gas or fuel oil at the option of the user.

According to the present invention, a burner assembly is provided for combining oxygen and fuel to produce a flame. The burner assembly includes a burner block formed to include a flame chamber having inlet and outlet openings, bypass means for conducting oxygen outside of the flame chamber to the outlet opening of the flame chamber, and means for discharging fuel into the flame chamber formed in the burner block.

The burner assembly also includes an oxygen-supply housing including chamber means for receiving a supply of oxygen and a base wall adjacent to the burner block. The base wall is formed to include first aperture means for discharging oxygen from the chamber means into the flame chamber and second aperture means for discharging oxygen from the chamber means into the bypass means.

In preferred embodiments, pure oxygen under pressure is admitted into the chamber means. Some of this pressurized oxygen is discharged into the inlet opening of the flame chamber through the first aperture means formed in the base wall. The rest of this pressurized oxygen is discharged from the chamber means through the second aperture means formed in the base wall to bypass the flame chamber and follow predetermined paths to the outlet opening of the flame chamber.

Illustratively, a flow-metering device is provided to control flow of oxygen discharged through the first aperture means into the inlet opening of the flame chamber. The flow-metering device is formed to include a first-stage oxygen port controlling flow of oxygen into the inlet opening of the flame chamber. The second aperture means defines a second-stage oxygen port controlling flow of oxygen to the outlet opening of the flame chamber.

By establishing a fixed ratio between the effective cross-sectional area of the first-stage oxygen port and the effective cross-sectional area of the second-stage oxygen port, it is possible to proportion and control the relative flow of oxygen to each of the inlet and outlet openings of the flame chamber. Illustratively, a first set of holes is formed in the flow-metering device to define the first-stage oxygen port and a second set of holes is formed in the base wall to define the second-stage oxygen port. Advantageously, it is possible to change the fixed ratio described above simply by varying the diameter of the holes formed in the base wall at the time that those holes are created (e.g., drilled or milled).

Some of the pressurized oxygen discharged from the oxygen-supply housing chamber means (i.e., "first-stage oxygen") passes through the first aperture means and the first-stage oxygen port formed in the flow-metering device and then mixes with fuel provided by the discharging means in a first-stage region inside the flame chamber. This combustible fuel and oxygen mixture can be ignited to define a flame having a root portion in the flame chamber and a tip portion outside the flame chamber.

The burner block is also formed to include oxygen-discharge ports around the outlet opening of the flame chamber and oxygen-conducting means for conducting oxygen along one or more paths through the burner block and outside of the flame chamber to the oxygen-discharge ports. The rest of the pressurized oxygen discharged from the oxygen-supply housing chamber means passes through the second aperture means formed in the base wall into the oxygen-conducting means formed in the burner block. This "second-stage" oxygen passes through the oxygen-discharge ports and is ejected from the burner block into a downstream second-stage region containing a portion of the flame and lying outside the flame chamber.

In preferred embodiments, the burner block is made of a refractory material and includes an outside wall formed to include the flame chamber inlet opening and a plurality of oxygen-admission ports around the inlet opening. The burner block also includes a furnace wall configured to lie in a furnace and formed to include the flame chamber outlet opening and the plurality of oxygen-discharge ports around the outlet opening.

Illustratively, the burner block is also formed to include a plurality of oxygen-conducting passageways. These passageways are formed during casting of the burner block. Each passageway extends through the burner body to connect one of the oxygen-admission ports to one of the oxygen-discharge ports. Essentially, these passageways are arranged to bypass the flame chamber and deliver second-stage oxygen to the second-stage region downstream of the flame chamber. Illustratively, the second-stage region lies in a furnace adjacent to the burner block and the flame produced by the burner assembly heats products in the furnace.

The oxygen-supply housing is provided to hold temporarily a supply of pressurized combustion oxygen for use in the burner assembly. In use, a continuous stream of pressurized oxygen is admitted into the oxygen-supply housing using any suitable means. Some of that pressurized oxygen is distributed to the first-stage region through the first aperture means and the rest of that pressurized oxygen is distributed by the bypass means to the second-stage region using the oxygen-conducting passageways formed in the burner block.

The burner assembly in accordance with the present invention introduces combustion oxygen into two regions or combustion zones. The first-stage combustion zone is near the root of the flame inside the flame chamber and the second-stage combustion zone is in the furnace itself in a location downstream from the flame chamber and nearer to the tip of the flame. Advantageously, by withholding a portion of the combustion oxygen from the root of the flame, the fuel partially burns and the fuel-bound nitrogen is converted into reducing agents. These nitrogenous compounds are subsequently oxidized to elemental nitrogen, thereby minimizing the generation of fuel nitrogen oxides. Also, the peak flame temperature is lowered in the fuel-rich first-stage combustion zone since the generated heat dissipates rapidly. This reduction in flame temperature reduces the formation of nitrogen oxides which are temperature-dependent. In the second-stage combustion zone, additional oxygen is injected through the burner block oxygen-discharge ports to complete combustion and optimize flame shape and length.

Illustratively, the burner assembly includes several modular components that can be assembled and changed easily. An oxygen-supply housing can be connected to or disconnected from a burner block using a frame and removable fasteners. A fuel nozzle module is mounted in the oxygen-supply housing so that it can be removed easily. By replacing a gas-fuel nozzle module with an oil-fuel nozzle module, it is possible to convert the burner assembly from a gas-burning unit to an oil-burning unit.

Additional features and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which:

FIG. 1 is a perspective view of a burner assembly in accordance with the invention showing an oxygen-supply housing coupled to a burner block, an oxygen-supply source coupled to the oxygen-supply housing, and a fuel supply source coupled to a gas-fuel nozzle module mounted in the oxygen-supply housing;

FIG. 3A is a side elevation view taken along line 3A—3A of FIG. 2 showing the burner block, the oxygen-supply housing containing a gas-fuel nozzle module, the fuel-discharge head of the gas-fuel nozzle module at the inlet end of a flame chamber in the burner block, first-stage means for supplying oxygen from the oxygen-supply housing through the oxygen flow-metering device appended to the fuel-discharge head into a first-stage combustion zone in the flame chamber, and second-stage means for conducting oxygen from the oxygen-supply housing to a second-stage combustion zone downstream of the flame chamber using bypass passages formed in the burner block and the frame joining the oxygen-supply housing to the burner block;

FIG. 7 is another alternative embodiment of the burner assembly of FIG. 3A showing an oil-oxygen atomizing fuel nozzle module mounted in the oxygen-supply housing.

DETAILED DESCRIPTION OF THE DRAWINGS

Figure 2:
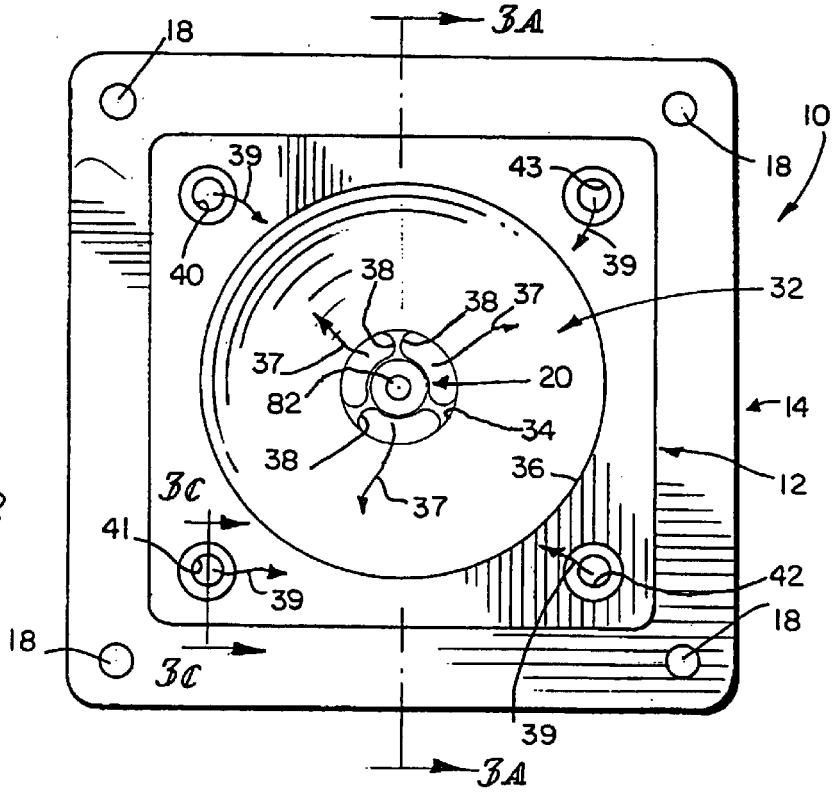
FIG. 2 is a front elevation view taken along line 2—2 of FIG. 1 showing four oxygen-discharge ports formed in the furnace wall of a burner block and arranged to lie around the outlet opening of a flame chamber formed in the burner block and showing three kidney-shaped oxygen-flow apertures formed in an oxygen flow-metering device and arranged to surround a fuel-discharge head of the gas-fuel nozzle module.

As shown in FIG. 1, a staged oxygen burner assembly 10 includes a burner block 12, a frame 14 mounted on an inlet end of the burner block 12, and a hollow oxygen-supply housing 16 mounted on the frame 14 by means of removable fasteners 18. A fuel nozzle 20 is positioned to lie inside the hollow oxygen-supply housing 16 and is retained in place by means of a removable collar 22. It is easy to replace the fuel nozzle 20 because of the modular nature of the staged oxygen burner assembly 10. For example, to convert the staged oxygen burner assembly 10 from a gas-fired unit to an oil-fired unit, it is necessary only to replace the gas-fuel nozzle module shown in FIG. 3A with the oil-fuel nozzle module shown in FIG. 7. *As shown in FIG. 1, removable collar 22 includes an outer surface 220, an opposite inner surface 222 facing toward burner block 12, and an external side wall 224 extending between outer and inner surfaces 220, 222. Illustratively, external side wall 224 includes a plurality of generally flat bounding surfaces 226 that are configured to cooperate with a corresponding socket wrench (not shown). Referring now to FIG. 3A, collar 22 further includes an internal side wall 228 defining a passageway 230 between outer and inner surfaces 220, 222. Internal side wall 228 includes a threaded portion 232 positioned to lie adjacent inner surface 222, a limit tab 234 positioned to lie adjacent outer surface 220, and a recess 236 positioned to lie between threaded portion 232 and limit tab 234. As shown in FIG. 3A, threaded portion 232 presses rear lip portion 75 into engagement with mounting fixture 71 and limit tab 234 engages mounting fixture 71 to support gas conduit 20.*

Pressurized oxygen is delivered to hollow oxygen-supply housing 16 from oxygen supply 24 through conduit 26 using any suitable means. Pressurized fuel is delivered to fuel nozzle 20 from fuel supply 28 through conduit 30 using any suitable means. The oxygen-supply housing 16 cooperates with frame 14 and burner block 12 to deliver some of the combustion oxygen in oxygen-supply housing 16 to a first-stage region near the root of a flame inside the burner block 12 and the rest of the combustion oxygen to a second-stage region at a point closer to the tip of the flame outside the burner block 12. This staged oxygen burner assembly 10 meters the combustion oxygen to each stage so as to minimize unwanted nitrogen oxide emissions. The apparatus used to accomplish this oxygen-metering function is precise and easy to manufacture and use and will be described in more detail below.

The burner block 12 is formed to include a flame chamber 32 as shown in FIGS. 2 and 3A. The flame chamber 32 has an inlet opening 34 at one end and an outlet opening 36 at its opposite end. Illustratively, as shown in FIG. 2, the first-stage oxygen 37 is discharged into the inlet opening 34 of the flame chamber 32 through three kidney-shaped oxygen-flow apertures 38 and the second-stage oxygen 39 is discharged at points adjacent to the outlet opening 36 of the flame chamber 32 through four oxygen-discharge ports 40, 41, 42, 43.

As shown in FIG. 3A, burner assembly 10 is used in industrial processes to produce a flame 44 that extends into a furnace 46. Various products 48 can be conveyed through the furnace 46 to be treated or processed using heat generated by flame 44. Burner assembly 10 is configured to heat products 48 conveyed through the furnace 46 and to minimize the amount of nitrogen oxide produced during combustion. In particular, burner assembly 10 includes a staged oxygen supply system that operates to deliver some of the combustion oxygen to a first-stage region near the root of flame 44 and the rest of the combustion oxygen to a second-stage region at a point closer to the tip of flame 44. By diverting some of the combustion oxygen toward the tip of flame 44, it is possible to reduce nitrogen oxide emissions. Burner assembly 10 can be used in a wide variety of applications due to its enhanced emissions performance.

As shown in FIG. 3A, burner assembly 10 is configured to include a natural gas burner 69 of the type disclosed in U.S. Pat. No. [4,690.635] *4,690,635*. Illustratively, the burner 69 is mounted in the oxygen-supply housing 16 in the manner shown in FIG. 3A.

Oxygen-supply housing 16 includes a base wall 52 coupled to frame 14 by the removable fasteners 18 and a hollow shell 54 appended to the base wall 52 to define a chamber 56 for receiving a supply of pressurized oxygen 57 from the oxygen supply 24. The hollow shell 54 illustratively has a pyramidal shape and four triangular side walls 58. One of these triangular side walls 58 is formed to include an oxygen-admission port 60 coupled to the conduit 26 carrying pressurized oxygen from oxygen supply 24. Although shell 54 could have a round, square, rectangular, or other shape, a pyramidal shape is presently preferred to conserve space in a furnace application.

As shown in FIGS. 1 and 2, the hollow shell 54 includes a tip 62 at one end and the four triangular side walls 58 extend in diverging relation from the tip 62 to the base wall 52. Illustratively, the tip 62 is somewhat cylindrical in shape and is formed to include a central aperture 64. A portion of the base wall 52 under the hollow shell 54 is formed to include a first aperture 66 and four second apertures 68 around the first aperture 66. The pressurized first-stage oxygen 37 is discharged from the oxygen-supply housing chamber 56 through the first aperture 66 formed in the base wall 52. At the same time, the pressurized second-stage oxygen 39 is discharged from the oxygen-supply housing chamber 56 through the second apertures 68 formed in the base wall 52. Illustratively, these second apertures 68 lie in radially spaced-apart relation to the first aperture 66 and in circumferentially spaced-apart relation to one another.

A gas conduit 70 is disposed within housing 12 and has means thereon for directing a gaseous fuel therethrough to be expelled from gas conduit 70 and to mix with the oxygen for burning in a sustainable flame. Gas conduit 70 may preferably have one or more O-ring seals 72 disposed at a mounting fixture 71 formed near the outer end of the gas conduit for effectuating a seal with a rear lip portion 75 of the tip 62 of hollow shell 54. *As shown in FIG. 3A, mounting fixture 71 includes an outer end 250 and an opposite inner end 252 facing chamber 56. In addition, rear lip portion 75 of hollow shell 54 includes an inner surface 239 facing O-ring seals 72 and an opposite outer surface 240 facing removable collar 22. Threaded portion 232 of collar 22 engages outer surface 240 of rear lip portion 75 to removable collar on hollow shell. In addition, limit rib 234 engages mounting fixture 71 to trap mounting fixture between limit rib and inner surface 239 of rear lip portion 75 within passageway 230.*

Figures 3B, 3C:
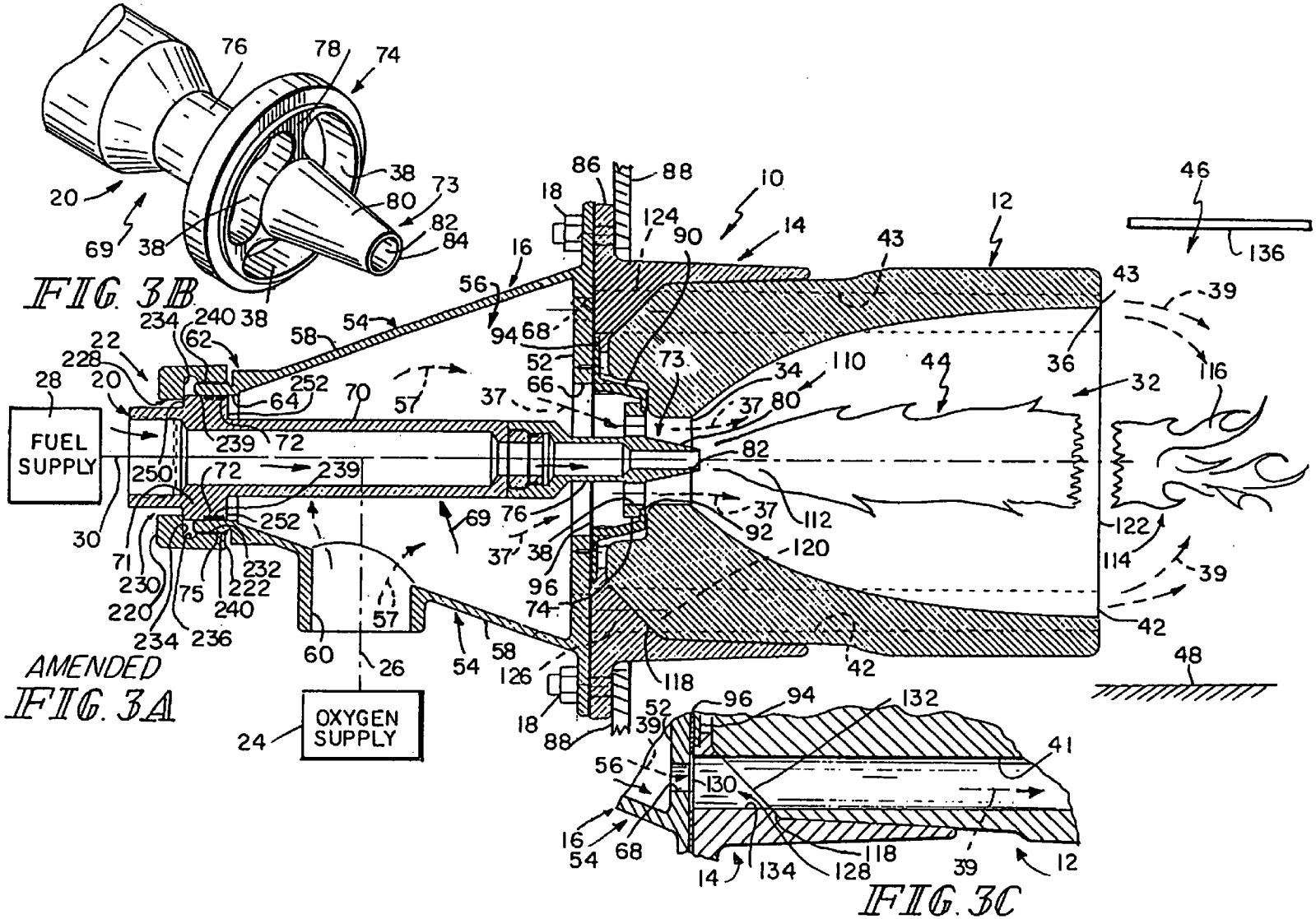
FIG. 3B is a perspective view of the fuel-discharge head of the gas-fuel nozzle module illustrated in FIGS. 1 and 2 showing three kidney-shaped oxygen-flow apertures formed in a ring-shaped oxygen flow-metering device appended to the fuel-discharge head.
FIG. 3C is an enlarged sectional view of a portion of the burner assembly taken along line 3C—3C of FIG. 2 showing a base wall of the oxygen-supply housing, a wall aperture formed in the base wall, a larger diameter oxygen-conducting channel formed in the frame joining the oxygen-supply housing to the burner block, and an oxygen-conducting passageway formed in the burner block.

The natural gas burner 69 further includes a gas conduit tip or fuel-discharge head 73 connected to gas conduit 20 by gas conduit channel 76 and includes a substantially flat exterior tip face surface 78 as shown best in FIG. 3B. Exterior tip face 78 has a substantially frustoconical-shaped prominence 80 disposed thereon and protruding from tip face 78. The flow-metering device 74 is a ring-shaped flange that is formed to include the three kidney-shaped oxygen-flow apertures 38 and appended to gas conduit tip 73 as shown in FIGS. 3A and 3B. Once the natural gas burner 69 is installed in the oxygen-supply housing 16 as shown in FIG. 3A, the frustoconical-shaped prominence 80 is positioned to extend into the inlet opening 34 of flame chamber 32 and the flow-metering device 74 is positioned to lie between the first aperture 66 in base wall 52 and the inlet opening 34.

Gas conduit tip 73 also includes a central gas channel 82 centrally disposed therethrough and terminating at the proximal end of frustoconical-shaped prominence 80 to form substantially a knife edge-shaped rim 84 thereon. Such knife edge-shaped rim 84 structure functions to delay combustion for a few microseconds and to provide no substantial available surface for the accumulation of carbon thereon. The opening of central gas channel 82 is preferably disposed in a plane spaced at a selected distance away from the plane of tip face 78.

The oxygen-flow apertures 38 formed in flow-metering device 74 cooperate to define a first-stage oxygen port having a first effective cross-sectional area that is equivalent to the sum of the cross-sectional areas of the three kidney-shaped oxygen-flow apertures 38. In a presently preferred embodiment, oxygen flow apertures 38 are disposed in a circular array, which array is substantially concentric with central gas channel 82. These oxygen-flow apertures 38 function to pass pressurized oxygen that is discharged from the oxygen-supply housing chamber 56 through the first aperture 66 into the burner block flame chamber 32 through its inlet opening 34. In operation, pressurized oxygen from oxygen-supply housing 16 passes through oxygen-flow apertures 38 into the flame chamber 32 to mix with natural gas or other gaseous fuel supplied through central gas channel 82 of gas conduit tip 73. This combustible mixture is ignited in flame chamber 32 to produce flame 44 using any suitable means.

The oxygen-supply housing 16, as shown in FIGS. 1 and 3A, is connected to a metal support block holder or frame 14 having a refractory burner block 12 retained in position with a suitable high temperature cement (not shown). The burner block 12 is made of, for example, zirconia or ZEDMUL 20C, and is formed to include a longitudinally extending and diverging flame chamber 32. The frame 14 has a flange portion 86 for attachment to the wall 88 of furnace 46. As shown in FIG. 3A, the burner assembly 10 includes a nose portion 90 provided with a central discharge orifice or annular opening 92. The nose portion 90 has a mounting flange 94 adjacent its inlet end which is suitably secured to the base wall 52 using mounting pins as shown in FIG. 3A. A gasket 96 is provided between mounting flange 94 and base wall 52 and the gasket 96 is formed to include a large opening at first aperture 66.

As shown in FIG. 3A, the burner assembly 10 is configured to provide a first-stage combustion zone 110 in a region inside flame chamber 32 near the root 112 of flame 44 and a second-stage combustion zone 114 in a region inside furnace 46 and outside of the flame chamber 32 toward the tip 116 of flame 44. A continuous stream of combustion oxygen 57 is supplied to oxygen-supply housing 16 through supply pipe 26 to ensure that housing 16 always contains pressurized oxygen. A first stream 37 of combustion oxygen is discharged from housing 16 into the first-stage combustion zone 110 through central discharge orifice 92 in nose portion 90 as described above. A second stream 39 of combustion oxygen is discharged from housing 16 into the second-stage combustion zone 114 through several passageways bypassing the flame chamber 32 as shown in FIG. 3A.

As shown in FIGS. 2, 3A, and 3C, burner block 12 is formed to include four longitudinally extending bypass passageways 40, 41, 42, and 43 for conducting the second stream 39 of combustion oxygen to the second-stage combustion zone 114 without passing through the flame chamber 32 formed in the burner block 12. Burner block 12 includes an outside wall 118 that is formed to include an inlet opening 120 into each of the oxygen-conducting passageways 40, 41, 42, and 43 and a furnace wall 122 that is formed to include an outlet opening for each of the oxygen-conducting passageways 40, 41, 42, and 43. The flame chamber 32 has an inlet opening 34 formed in an inner portion of burner block 12 and an outlet opening 36 formed in furnace wall 122 of burner block 12. As shown in FIG. 2, the four outlet openings are arranged in uniformly circumferential spaced-apart relation around the nozzle 20 and the inlet opening 34 of the flame chamber 32. The four outlet openings are also arranged to lie in radially equidistant relation from the burner tip opening 82 as shown best in FIG. 2.

Four oxygen-conducting channels are formed in frame 14 to conduct the second stream 39 of combustion oxygen from outlets 68 formed in the oxygen-supply housing 16 to the oxygen-conducting passageways 40, 41, 42, and 43 formed in the burner block 12. Two of these oxygen-conducting channels 124, 126 are shown in FIG. 3A and one oxygen-conducting channel 128 is shown in greater detail in FIG. 3C. Each oxygen-delivery channel illustratively includes an inlet end 130, an outlet end 132, and a straight portion 134 between the inlet and outlet ends 130 and 132 as shown in FIG. 3C. It will be understood that the number and shape of the oxygen-conducting channels can vary depending upon the application and also upon the location of the housing 16 and the inlet openings 120 into the oxygen-conducting passageways formed in the burner block 12.

The second apertures 68 formed in the base wall 52 are sized to regulate the flow of the second stream 39 of pressurized oxygen through the oxygen-conducting channels formed in frame 14 and the oxygen-conducting passageways 40, 41, 42, and 43 formed in the burner block 12 to the second-stage combustion zone 114. *The oxygen-conducting channels formed in frame 14 and the oxygen-conducting passageways 40, 41, 42 and 43 formed in the burner block 12 cooperate to define an oxygen conductor conduit configured to conduct oxygen from the second apertures 68 formed in the base wall 52 to the second-stage combustion zone 114.* The internal diameter of each second aperture 68 is less than the internal diameter of the corresponding oxygen-conducting channel 128 formed in the frame 14 and the internal diameter of the corresponding oxygen-conducting passageway 41 formed in the burner block 12 as shown, for example, in FIG. 3C. Conveniently, the size of each second aperture is selected to produce the lowest nitrogen oxide emission for the desired flame shape and luminosity for the particular burner application.

The effective cross-sectional open area of the second apertures 68 is set when those apertures 68 are drilled in the base wall 52. By reducing the internal diameter of one or more of the second apertures 68 as compared to the relatively larger internal diameters of the corresponding downstream channels and passageways formed, respectively, in the frame 14 and burner block 12, it is possible to limit or otherwise regulate and control the flow of pressurized oxygen 39 that passes to the second-stage combustion zone 114. It will be understood that the flow of the second stream of oxygen 39 is limited by the size of the second apertures 68 since the cross-sectional area of each aperture is preferably less than the cross-sectional area of its corresponding downstream frame channel and burner block passageway. Although it is within the scope of the present invention to make the open area of one or more second apertures 68 greater than the open area of the corresponding downstream channels and passageways, such a design would make it more difficult to change the flow of second-stage oxygen since it would now be necessary to vary the cross-sectional areas of one or more of the frame channels or burner block passageways.

It is within the scope of the present invention to proportion the flow of pressurized oxygen discharged from the oxygen-supply housing 16 into the first-stage combustion zone 110 and the second-stage combustion zone 114 by forming the oxygen-flow apertures 38 in the flow-metering device to have an effective cross-sectional area that is fixed in relation to the effective cross-sectional area of the second apertures 68 formed in base wall 52. Essentially, these two effective cross-sectional areas are proportioned or ratioed to create a staged oxygen burner assembly having low nitrogen oxide emissions. In a presently preferred embodiment, the effective cross-sectional area of the kidney-shaped oxygen-flow apertures 38 (i.e., the first-stage oxygen port) is set during the manufacture of the flow-metering device 74 appended to the natural gas burner 69. The ratio of oxygen flow between the first-stage combustion zone 110 and the second-stage combustion zone 114 can then be varied to suit any particular application by drilling or otherwise forming the second apertures 68 in the base wall 52 of the oxygen-supply housing 16. It will be understood that stock housings 16 with undrilled base walls 52 can be adapted easily to change the oxygen flow ratio between the first- and second-stage combustion zones 110, 114 simply by selecting an internal diameter for each of the second apertures 68 that is calculated to achieve the desired result. Because of the modular nature of burner assembly 10, it is possible to change such staged oxygen flow ratio simply by removing the old oxygen-supply housing 16 having one set of second apertures 68 formed in the base wall 52 and replacing it with a new oxygen-supply housing having a different set of second apertures 68.

By shutting off or varying the flow of combustion oxygen 39 through one or more of oxygen-conducting channels formed in frame 14 and oxygen-conducting passageways 40, 41, 42, and 43 formed in burner block 12, it is possible to control the luminosity and shape of flame 44. It has been observed that flame 44 tends to bend slightly toward an oxygen source and that a non-geometrically perfect flame may exhibit less nitrogen oxide (perhaps as a result of some imbalance in mixing fuel and oxygen).

Flame 44 can include a yellow luminous portion and a "cooler" blue non-luminous portion. In the glass industry, it is often preferred to produce a flame having a luminous portion adjacent to glass 48 heated in furnace 46. Glass furnace operators typically prefer to position the "cooler" non-luminous portion of the flame 44 facing toward the roof 136 of the furnace 46. This allows the furnace crown or roof 136 to run cooler, lose less heat, and extend its useful life. It has been observed that supplying oxygen to a flame causes the oxygen-rich portion of the flame to become more non-luminous.

It will be understood that is possible to vary the internal diameter of one or more second apertures 68 relative to the other second apertures 68 to control the luminosity and shape of flame 44. It is also within the scope of the present invention to eliminate (e.g., never drill) one or more second apertures 68 in base wall 52 to block flow of pressurized oxygen into and through one or more frame channels and burner block passageways to reach the second-stage combustion zone 114. Reference is hereby made to parent application No. 08/092,008, filed Jul. 15, 1993, which is incorporated by reference herein, for a more detailed discussion of means for regulating oxygen flow to vary flame luminosity and shape.

Figure 4:
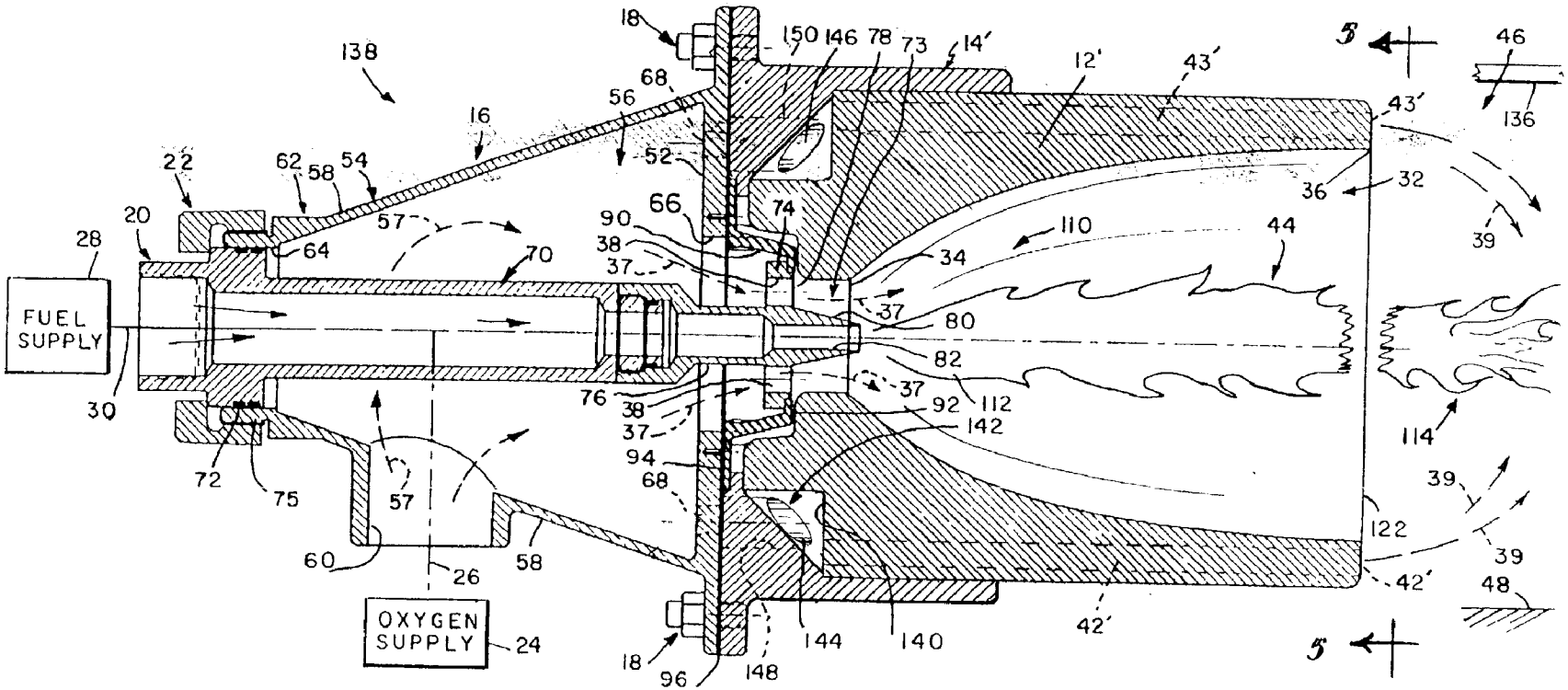
FIG. 4 is an alternative embodiment of the burner assembly of FIG. 3A showing an annular oxygen-distributing manifold provided between the frame and the burner block.
Figure 5:
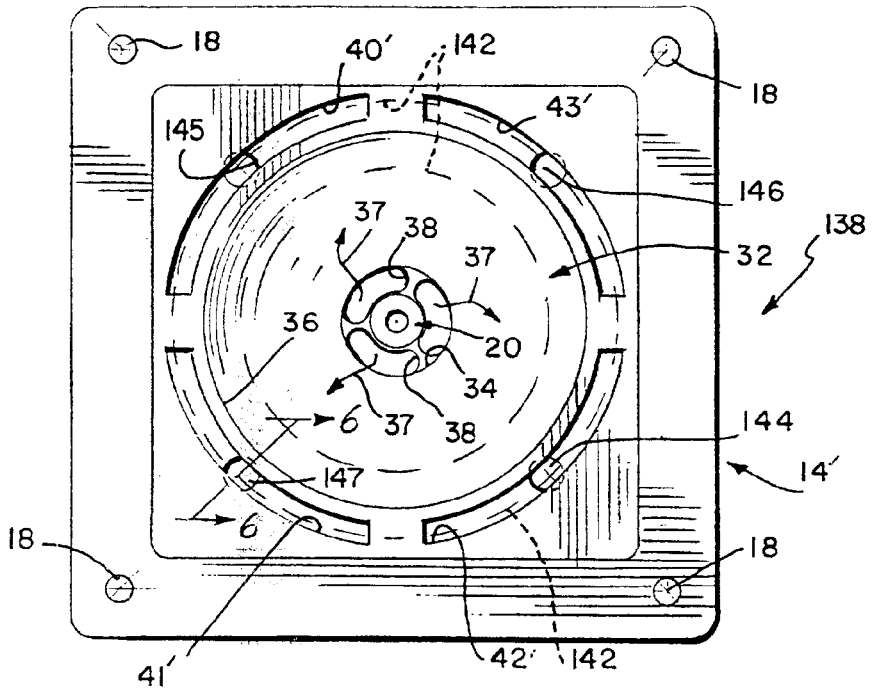
FIG. 5 is a front elevation view taken along line 5—5 of FIG. 4 showing four arcuate oxygen-discharge ports formed in the furnace wall of the burner block and arranged to lie around the outlet opening of the flame chamber formed in the burner block.
Figure 6:
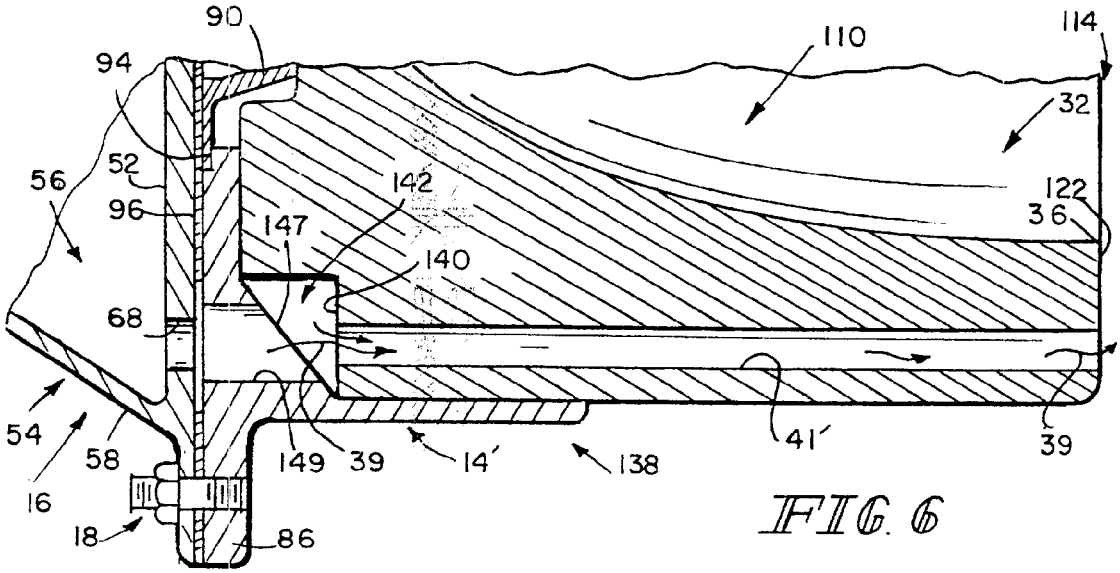
FIG. 6 is an enlarged sectional view of a portion of the burner assembly taken along line 6—6 of FIG. 4 showing a base wall of the oxygen-supply housing, a wall aperture formed in the base wall, a larger diameter oxygen-conducting channel formed in the frame joining the oxygen-supply housing to the burner block, a circular oxygen-distributing manifold provided between the frame and the burner block, and an oxygen-conducting passageway formed in the burner block.
Figure 8:
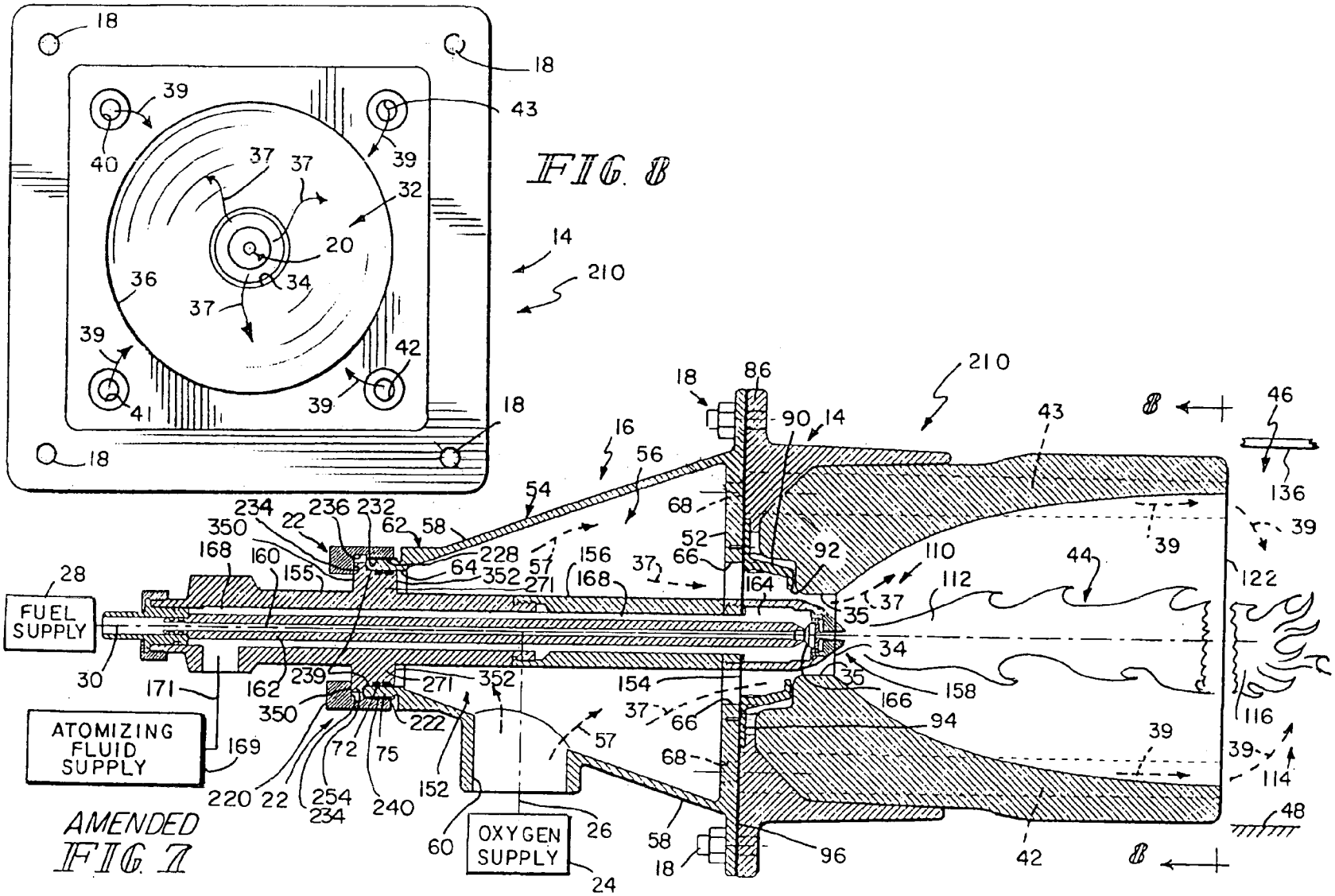
FIG. 8 is a front elevation view taken along line 8—8 of FIG. 7.

The burner assembly 138 shown in FIGS. 4–6 is similar to the burner assembly 10 shown in FIG. 3A. In the embodiment of FIGS. 4–6, the burner block 12' is formed to include an annular channel 140 surrounding the nose portion 90 and interconnecting each of oxygen-conducting passageways 40', 41', 42', and 43' in fluid communication. The frame 14' includes means for covering the annular channel 140 to define a circular oxygen-conducting passageway 142 therebetween. This circular passageway 142 receives pressurized oxygen 39 from oxygen-conducting channels formed in the frame 14' and connected to the second apertures 68 formed in the base wall 52 and transfers that pressurized oxygen 39 into the oxygen-conducting passageways 40', 41', 42', and 43' formed in the burner block 12'. Two outlet apertures 144, 146 from two of the oxygen-conducting channels 148, 150 formed in frame 14 are shown in FIG. 4.

[AS] *As* shown in FIG. 5, the oxygen-conducting passageways 40', 41', 42', and 43' formed in burner block 12' have an arcuate shape and terminate in annular openings extending around the outlet opening 36 of the flame chamber 32. As shown in FIGS. 5 and 6, pressurized oxygen passes in sequence from chamber 56 in oxygen-supply housing 16 through second apertures 68, frame channels 149, and outlet apertures 144, 145, 146, and 147, circular passageway 142, and annular oxygen-conducting passageways 40', 41', 42', and 43' to the second-stage combustion zone 114.

The only difference between the embodiment of FIG. 7 and the embodiment of FIG. 3A is the type of fuel nozzle module mounted in the oxygen-supply housing 16. A natural gas nozzle 69 is used in the embodiment of FIG. 3A and an oil nozzle 152 is used in the embodiment of FIG. 7. Reference is hereby made to parent application No. 08/092,008, filed Jul. 15, 1993, which, as noted above, is incorporated by reference herein, for a complete description of oil nozzle 152.

As shown in FIG. 7, the burner assembly 210 includes a nose portion or nose piece 90 provided with a central discharge orifice or annular opening 92. An oil-delivery assembly 152 is shown centrally mounted within the oxygen-supply housing 16 by means of a spider or centering ring 154. The fuel-delivery assembly 152 is shown to include an inlet body portion 155, a central body portion 156, and a burner tip portion 158. *Body portion 155 includes a mounting fixture 271 for effectuating a seal with a rear lip portion 75 of the tip 62 of hollow shell 56. Mounting fixture 271 includes an outer end 350 and an opposite inner end 352 facing chamber 56. Threaded portion 232 and limit rib 234 of removable collar 22 cooperate to support burner tip portion 158 in an installed position within the inlet opening 34. Thus, to convert staged oxygen burner assembly 10 from a gas-fired unit to an oil-fired unit, it is necessary only to remove collar 22 from rear lip portion 75 of hollow shell 56, pull nozzle 20 from chamber 56, insert fuel-delivery assembly 152 into passageway so that burner tip portion extends through inlet opening 34, and couple collar 22 to rear lip portion 75 and mounting fixture 271.* A central fuel-oil passageway 160, formed in a channel member 162, is provided with an inlet connector for receiving a suitable supply of fuel such as oil.

The burner tip portion 158 forms a chamber 164 between a forward channel portion of the channel member 162 and the inner circumferential wall portion of the burner tip portion 158. An atomizing member 166 is secured to an outlet end of the forward channel portion and projects within the central fuel-oil passageway 160. The forward end of the burner tip portion 158 terminates at its outer end in a burner tip opening.

An atomizing fluid passageway 168 extends through the inlet body portion 155 and central body portion 156 of the fuel assembly 152 exteriorly of channel member 162, and communicates at its outlet end with the chamber 164 formed between the burner tip portion 158 and the channel member 162. The atomizing fluid passage 168 is provided at its inlet end with a connector for receiving a suitable supply of atomizing fluid such as oxygen from atomizing fluid supply 169 coupled to atomizing fluid passage 168 by conduit 171. The centering ring or spider 154 is provided with a plurality of openings or ports for the flow of oxygen outwardly along the outer surface of burner tip portion 158.

An oxygen inlet 60 communicates with the oxygen-supply housing 16 which surrounds the central body portion 156 and the burner tip portion 158 of the fuel-delivery assembly 152. A first portion 37 of the oxygen supplied to the housing 16 exits first aperture 66 formed in base wall 52 through the plurality of oxygen ports or openings formed in the spider or centering ring 154, so as to provide an oxygen envelope about the atomized oil discharged from the outlet end of the fuel assembly 152. A remaining portion 39 of the oxygen supplied to the housing 16 is diverted to flow through second apertures 68 formed in base wall 52 along a different path to reach flame 44 in the manner described above. Such diversion of combustion oxygen flow is an important feature of the staged oxygen-fuel burner assembly and contributes to the lowered nitrogen oxide emissions achieved by the burner assembly 210.

Although the invention has been described in detail with reference to certain preferred embodiments, variations and modifications exist within the scope and spirit of the invention as described and defined in the following claims.

I claim:

1. A burner assembly for combining oxygen and fuel to produce a flame, the burner assembly comprising a burner block formed to include a flame chamber having an inlet opening and an outlet opening, bypass means for conducting oxygen outside of the flame chamber to the outlet opening of the flame chamber, an oxygen-supply housing including chamber means for receiving a supply of oxygen and a base wall adjacent to the burner block, the base wall being formed to include first aperture means for discharging oxygen from the chamber means into the flame chamber and second aperture means for discharging oxygen from the chamber means into the bypass means, *said first and second aperture means metering the supply of oxygen passing therethrough,* and means for discharging fuel into the flame chamber formed in the burner block, the discharging means including a nozzle extending through the chamber means and the first aperture means formed in the base wall *and supported by the base wall* to discharge fuel into the flame chamber.

2. The burner assembly of claim 1, wherein the oxygen-supply housing includes a hollow shell appended to the base wall to define the chamber means therebetween.

3. The burner assembly of claim 1, wherein the burner block is formed to include at least one oxygen-admission port lying adjacent to the base wall and communicating with the second aperture means and the bypass means is coupled to the oxygen-admission port and arranged to pass through the burner block to conduct oxygen from the chamber means through the burner block to the outlet opening of the flame chamber.

4. The burner assembly of claim 3, wherein the oxygen-supply housing further includes a frame located between the base wall and the burner block and coupled to the burner block and fastening means for connecting the base wall to the frame and the frame is formed to include at least one oxygen-conducting channel interconnecting the second aperture means and the bypass means in fluid communication.

5. The burner assembly of claim 4, wherein the second aperture means includes a plurality of wall apertures formed in the base wall and the burner block is formed to include an oxygen-admission port communicating with each wall aperture through one of the oxygen-conducting channels.

6. The burner assembly of claim 3, wherein the second aperture means includes a plurality of wall apertures formed in the base wall and the burner block is formed to include an oxygen-admission port communicating with each wall aperture.

7. The burner assembly of claim 6, further comprising frame means for supporting the burner block, the base wall being mounted on the frame means, and the frame means being formed to include oxygen-conducting channels interconnecting the wall apertures formed in the base wall and the oxygen-admission ports formed in the burner block.

8. The burner assembly of claim 1, wherein the nozzle is one of a gas-fuel nozzle and an oil-fuel nozzle.

9. The burner assembly of claim 1, wherein the chamber means formed in the oxygen-supply housing contains only the nozzle.

10. The burner assembly of claim 1, wherein only the nozzle passes through the first aperture means formed in the base wall.

11. The burner assembly of claim 1, wherein the base wall is rectangular, the first aperture means includes a first-stage aperture formed in a center portion of the rectangular base wall, and the second aperture means includes a second-stage aperture formed in each of four corner portions of the base wall and coupled to the bypass means.

12. The burner assembly of claim 1, wherein the discharging means further includes a removable collar engaging the nozzle and threadedly engaging the oxygen-supply housing.

13. The burner assembly of claim 12, wherein the oxygen-supply housing includes an annular lip defining a cylindrical nozzle aperture receiving the nozzle and the removable collar includes an annular side wall surrounding and engaging the annular lip.

14. The burner assembly of claim 1, wherein the first aperture means includes a first-stage aperture formed in the base wall, the second aperture means includes at least one second-stage aperture formed in the base wall and arranged to lie in spaced-apart relation to the first-stage aperture, the bypass means includes at least one oxygen-conducting passageway formed in the burner block and arranged to receive oxygen conducted through a corresponding second-stage aperture, and the internal diameter of each second-stage aperture formed in the base wall is less than the internal diameter of a corresponding oxygen-conducting passageway formed in the burner block to regulate flow of oxygen through the oxygen-conducting passageways formed in the burner block.

15. The burner assembly of claim 14, where the base wall is rectangular, the first-stage aperture is formed in a center portion of the rectangular base wall, and a second-stage aperture is formed in each of four corner portions of the rectangular base wall.

16. A burner assembly for combining oxygen and fuel to produce a flame, the burner assembly comprising a burner block formed to include a flame chamber having an inlet opening and an outlet opening, bypass means for conducting oxygen outside of the flame chamber to the outlet opening of the flame chamber, means for discharging fuel into the flame chamber formed in the burner block, [and]

an oxygen-supply housing including chamber means for receiving a supply of oxygen and a base wall adjacent to the burner block, the base wall being formed to include first aperture means for discharging oxygen from the chamber means into the flame chamber and second aperture means for discharging oxygen from the chamber means into the bypass means, *said first and second aperture means metering the supply of oxygen passing therethrough,* the oxygen-supply housing including a hollow shell appended to the base wall to define the chamber means therebetween, wherein the hollow shell has a pyramidal shape and includes at least one triangular side wall appended to the base wall and formed to include an oxygen-admission port*, and wherein the means for discharging fuel extends through the base wall*.

17. The burner assembly of claim 16, wherein the chamber means formed in the oxygen-supply housing contains only the nozzle.

18. The burner assembly of claim 16, wherein only the nozzle passes through the first aperture means formed in the base wall.

19. The burner assembly of claim 16, wherein the hollow shell includes a tip and four triangular side walls diverging from the tip toward the base wall.

20. The burner assembly of claim 16, wherein the base wall is rectangular, the first aperture means includes a first-stage aperture formed in a center portion of the rectangular base wall, and the second aperture means includes a second-stage aperture formed in each of four corner portions of the base wall and coupled to the bypass means.

21. A burner assembly for combining oxygen and fuel to produce a flame, the burner assembly comprising a burner block formed to include a flame chamber having an inlet opening and an outlet opening, bypass means for conducting oxygen outside of the flame chamber to the outlet opening of the flame chamber, means for discharging fuel into the flame chamber formed in the burner block, and an oxygen-supply housing including chamber means for receiving a supply of oxygen and a base wall adjacent to the burner block, the base wall being formed to include first aperture means for discharging oxygen from the chamber means into the flame chamber and second aperture means for discharging oxygen from the chamber means into the bypass means, *said first and second aperture means metering the supply of oxygen passing therethrough* the oxygen-supply housing including a hollow shell appended to the base wall to define the chamber means therebetween, wherein the hollow shell includes a tip and a side wall extending between the tip and the base wall, the tip is formed to include an aperture, and the discharging means includes a nozzle *supported by the base wall and* extending through the aperture formed in the tip and the first aperture means formed in the base wall and terminating in the inlet opening of the flame chamber.

22. The burner of claim 21, wherein the nozzle includes a fuel-discharge head, a mounting fixture, and means for metering oxygen flow, and the tip of the hollow shell is formed to include means for supporting the mounting fixture to position the fuel-discharge head in the inlet opening and the metering means at an interface between the first aperture means and the inlet opening to regulate oxygen flowing into the inlet opening and mixing with fuel discharged by the fuel-discharge head.

23. The burner assembly of claim 21, wherein the second aperture means includes a plurality of apertures formed in the base wall and each aperture is arranged to lie in radially spaced-apart relation to a portion of the nozzle extending through the first aperture means.

24. The burner assembly of claim 21, wherein the oxygen-supply housing further includes modular fastening means for selectively connecting the base wall to the burner block so that the oxygen-supply housing and the nozzle are joined together to form a modular unit containing the first and second aperture means that is removable from the burner block at the option of a user.

25. The burner assembly of claim 21, wherein the chamber means formed in the oxygen-supply housing contains only the nozzle.

26. The burner assembly of claim 25, wherein the frame is formed to include one oxygen-conducting channel for each of the apertures formed in the base wall and included in the second aperture means.

27. The burner assembly of claim 21, wherein the base wall is rectangular, the first aperture means includes a first-stage aperture formed in a center portion of the rectangular base wall, and the second aperture means includes a second-stage aperture formed in each of four corner portions of the base wall and coupled to the bypass means.

28. The burner assembly of claim 21, wherein discharging means further includes a removable collar engaging the tip of the hollow shell and the nozzle to retain the nozzle in a fixed position in the chamber means.

[29. A burner assembly for combining oxygen and fuel to produce a flame, the burner assembly comprising a burner block formed to include a flame chamber having an inlet opening and an outlet opening, bypass means for conducting oxygen outside of the flame chamber to the outlet opening of the flame chamber, means for discharging fuel into the flame chamber formed in the burner block, and an oxygen-supply housing including chamber means for receiving a supply of oxygen and a base wall adjacent to the burner block, the base wall being formed to include first aperture means for discharging oxygen from the chamber means into the flame chamber and second aperture means for discharging oxygen from the chamber means into the bypass means, the oxygen-supply housing further including a hollow shell appended to the base wall to define the chamber means therebetween and modular fastening means for selectively connecting the base wall to the burner block to position the first aperture means in confronting relation to the inlet opening of the frame chamber so that the oxygen-supply housing can be disconnected from the burner block during rehabilitation of the burner assembly, the modular fastening means including a frame positioned to lie between the base wall and the burner block, means for coupling the frame to the burner block, and fasteners interconnecting the base wall and the frame.]

[30. The burner assembly of claim 29, wherein the frame is formed to include at least one oxygen-conducting channel interconnecting the second aperture means formed in the base wall and the bypass means.]

[31. The burner assembly of claim 29, wherein the base wall is rectangular, the first aperture means includes a first-stage aperture formed in a center portion of the rectangular base wall, the second aperture means includes a second-stage aperture formed in each of four corner portions of the base wall and coupled to the bypass means, and the frame is formed to include one oxygen-conducting channel for each of the first-stage and second-stage apertures.]

[32. The burner assembly of claim 29, wherein the second aperture means includes a plurality of apertures formed in the base wall, the bypass means includes a plurality of passageways formed in the burner block, and the frame is formed to include at least one oxygen-conducting channel interconnecting one of the plurality of apertures and the plurality of passageways in fluid communication.]

[33. The burner assembly of claim 29, wherein the second aperture means includes at least one second-stage aperture formed in the base wall, at least one oxygen-conducting channel formed in the frame and arranged to receive oxygen conducted through a corresponding second-stage aperture, the bypass means includes at least one oxygen-conducting passageway formed in the burner block and arranged to receive oxygen conducted through a corresponding second-stage aperture and oxygen-conducting channel, and the internal diameter of each second-stage aperture formed in the base wall is less than the internal diameter of both of a corresponding oxygen-conducting channel formed in the frame and a corresponding oxygen-conducting passageway formed in the burner block to regulate flow of oxygen through the oxygen-conducting passageways formed in the burner block.]

34. [The burner assembly of claim 29,] *A burner assembly for combining oxygen and fuel to produce a flame, the burner assembly comprising*

*a burner block formed to include a flame chamber having an inlet opening and an outlet opening,*

*bypass means for conducting oxygen outside of the flame chamber to the outlet opening of the flame chamber,*

*means for discharging fuel into the flame chamber formed in the burner block,*

*an oxygen-supply housing including a chamber means for receiving a supply of oxygen and a base wall adjacent to the burner block, the base wall being formed to include first aperture means for discharging oxygen from the chamber means into the flame chamber and second aperture means for discharging oxygen from the chamber means into the bypass means, said first and second aperture means metering the supply of oxygen passing therethrough, and with the oxygen-supply housing further including a hollow shell appended to the base wall to define the chamber means therebetween the modular fastening means for selectively connecting the base wall to the burner block to position the first aperture means in confronting relation to the inlet opening of the flame chamber so that the oxygen-supply housing can be disconnected from the burner block during rehabilitation of the burner assembly, the modular fastening means including a frame positioned to lie between the base wall and the burner block, means for coupling the frame to the burner block, the fasteners interconnecting the base wall and the frame, and* wherein the burner block is formed to include a plurality of oxygen-conducting passageways defining the bypass means and an annular channel surrounding the inlet opening of the flame chamber and interconnecting each of the oxygen-conducting passageways, the frame includes means for covering the annular channel to define a circular oxygen-conducting passageway between the frame and the burner block and at least one oxygen-conducting channel interconnecting the second aperture means formed in the base wall and the circular oxygen-conducting passageway.

35. The burner assembly of claim 34, wherein the oxygen-conducting passageways formed in the burner block have an arcuate shape and terminate in annular openings formed in the burner block and arranged to lie around the outlet opening of the flame chamber formed in the burner block.

36. A burner assembly for combining oxygen and fuel to produce a flame, the burner assembly comprising a burner block formed to include a flame chamber having an inlet opening and an outlet opening, bypass means for conducting oxygen outside of the flame chamber to the outlet opening of the flame chamber, means for discharging fuel into the flame chamber formed in the burner block, an oxygen-supply housing including chamber means for receiving a supply of oxygen and a base wall adjacent to the burner block, the base wall being formed to include first aperture means for discharging oxygen from the chamber means into the flame chamber and second aperture means for discharging oxygen from the chamber means into the bypass means, *said first and second aperture means metering the supply of oxygen passing therethrough,* the burner block being formed to include at least one oxygen-admission port lying adjacent to the base wall and communicating with the second aperture means and the bypass means being coupled to the oxygen-admission port and arranged to pass through the burner block to conduct oxygen from the chamber means through the burner block to the outlet opening of the flame chamber, the second aperture means including a plurality of wall apertures formed in the base wall, the burner block being formed to include an oxygen-admission port communicating with each wall aperture, and frame means for supporting the burner block, the base wall being mounted on the frame means, the burner block being formed to include an annular channel around the inlet opening of the flame chamber, the frame means including means for covering the annular channel to define an annular oxygen-conducting passageway therein and means for communicating oxygen discharged from the chamber means through the wall apertures to the annular oxygen-conducing passageway for delivery to the outlet opening of the flame chamber through the bypass means, *and wherein the means for discharging fuel is supported by the base wall.*

37. A burner assembly for combining oxygen and fuel to produce a flame, the burner assembly comprising a burner block formed to include a flame chamber having an inlet opening and an outlet opening, bypass means for conducting oxygen outside of the flame chamber to the outlet opening of the flame chamber, means for discharging fuel into the flame chamber formed in the burner block, and an oxygen-supply housing including chamber means for receiving a supply of oxygen and a base wall adjacent to the burner block, the base wall being formed to include first aperture means for discharging oxygen from the chamber means into the flame chamber and second aperture means for discharging oxygen from the chamber means into the bypass means, *said first and second aperture means metering the supply of oxygen passing therethrough*, the discharging means including a fuel discharge nozzle and means for fixing the fuel discharge nozzle in the inlet opening, the fixing means being positioned to lie between the base wall and the burner block, the fixing means being formed to include third aperture means for conducting oxygen discharged through the first aperture means into the flame chamber, the third aperture means defining a first-stage oxygen port having a first effective cross-sectional area and communicating oxygen from the chamber means into the flame chamber, the second aperture means defining a second-stage oxygen port having a second effective cross-sectional area less than the first effective cross-sectional area and communicating oxygen from the chamber means to the outlet opening of the flame chamber through the bypass means.

38. The burner assembly of claim 37, wherein the third aperture means includes a flange appended to the fuel discharge nozzle and formed to include the first-stage oxygen port and the second aperture means includes a plurality of apertures formed in the base wall collectively to define the second-stage oxygen port.

39. The burner assembly of claim 38, wherein the flange is ring-shaped and is formed to include a plurality of apertures lying around the fuel-discharge nozzle and defining the first-stage oxygen port and each of the apertures formed in the base wall lies in radially spaced-apart relation to the fuel-discharge nozzle.

40. A burner assembly for combining oxygen and fuel to produce a flame, the burner assembly comprising a burner block formed to include a flame chamber having an inlet opening and an outlet opening, a nozzle including means for discharging fuel into the flame chamber formed in the burner block, means for fixing the nozzle adjacent to the burner block to position the discharging means at the inlet opening of the flame chamber so that a primary combustion zone is established in the flame chamber between the inlet and outlet openings, means for supplying oxygen to the flame chamber through the inlet opening so that the oxygen supplied by the supplying means mixes with the fuel discharged by the nozzle in a first-stage region inside the flame chamber to produce a combustible mixture that can be ignited in the primary combustion zone to define a flame having a root portion in the flame chamber and a tip portion outside the flame chamber, first-stage metering means for metering the flow rate of oxygen from the supplying means into the flame chamber through the inlet opening, the first-stage metering means being appended to the nozzle, bypass means for delivering oxygen from the supplying means into a downstream second-stage region containing a portion of the flame and lying outside the flame chamber to supplement oxygen supplied to the first-stage region inside the flame chamber by the supplying means, and second-stage metering means for metering the flow rate of oxygen from the supplying means into the bypass means so that the downstream second-stage region outside the flame chamber through the bypass means is fixed in proportion to the flow rate of oxygen passing through the first-stage metering means.

41. The burner assembly of claim 40, wherein fixing means includes a ring-shaped flange positioned to lie around the nozzle and formed to include at least one oxygen-flow aperture defining the first-stage metering means.

42. The burner assembly of claim 41, wherein the supplying means includes an oxygen-supply housing including chamber means for receiving a supply of oxygen and a base wall adjacent to the burner block and the fixing means further includes a support fixture coupled to the base wall and the ring-shaped flange.

43. The burner assembly of claim 42 wherein the support fixture includes a mounting flange fixed between the base wall and the burner block and a nose portion formed to include a central aperture and the ring-shaped flange is positioned to lie in the central aperture and is coupled to the nose portion to support the nozzle in the inlet opening of the flame chamber.

44. The burner assembly of claim 40, wherein the supplying means includes an oxygen-supply housing including chamber means for receiving a supply of oxygen and a base wall adjacent to the burner block, the fixing means includes a support fixture having a mounting flange fixed between the base wall and the burner block and a nose portion, the nose portion being formed to include a central opening receiving the nozzle, and the first-stage metering means includes a partition positioned to lie between the nozzle and the nose portion and formed to include the at least one oxygen-flow aperture.

45. The burner assembly of claim 44, wherein the partition is a ring-shaped flange surrounding the nozzle.

46. The burner assembly of claim 44, wherein the partition is positioned to lie in the central aperture of the nose portion.

47. The burner assembly of claim 40, wherein the supplying means includes an oxygen-supply housing including chamber means for receiving a supply of oxygen and a base wall adjacent to the burner block and the second-stage metering means includes at least one aperture formed in the base wall and arranged to interconnect to chamber means and the bypass means in fluid communication.

48. The burner assembly of claim 47, wherein the oxygen-supply housing includes a hollow shell appended to the base wall to define the chamber means therebetween.

49. The burner assembly of claim 48, wherein the base wall is formed to include first aperture means for discharging oxygen from the chamber means to the first-stage metering means, the hollow shell includes a tip and a side wall extending between the tip and the base wall, the tip is formed to include an aperture, the nozzle is mounted to extend through the aperture formed in the tip and the first aperture means formed in the base wall and to terminate in the outlet opening of the flame chamber, and the first-stage metering means includes a flow-metering ring appended to the nozzle and formed to include at least one oxygen-flow aperture.

50. The burner assembly of claim 40, wherein the nozzle includes the fuel-discharge head and a mounting fixture, the first-stage metering means is appended to the fuel-discharge head, the supplying means includes an oxygen-supply housing and the fixing means includes first support means for supporting the mounting fixture to position the fuel-discharge head in the inlet opening and second support means for supporting the first-stage metering means in a location between the oxygen-supply housing and the inlet opening.

51. The burner assembly of claim 50, wherein the supplying means includes an oxygen-supply housing including a hollow shell formed to include an aperture receiving the mounting fixture of the nozzle and the first support means includes a collar engaging the hollow shell to retain the mounting fixture in the aperture.

52. The burner assembly of claim 50, wherein the second support means includes a mounting flange fixed between the base wall and the burner block and a nose portion formed to include a central aperture receiving the fuel-discharge head.

53. The burner assembly of claim 50, wherein the first-stage metering means includes a ring positioned to lie around the fuel-discharge head and formed to include at least one oxygen-flow aperture.

[54. A burner assembly for combining oxygen and fuel to produce a flame, the burner assembly comprising a burner block formed to include a flame chamber having an inlet opening and an outlet opening, bypass means for conducting oxygen outside of the flame chamber to the outlet opening of the flame chamber, an oxygen-supply housing including chamber means for receiving a supply of oxygen, frame means for coupling the oxygen-supply housing to the burner block, a fuel nozzle module having a nozzle body and a discharge tip, and means for supporting the nozzle body of the fuel nozzle module in the chamber means to aim the discharge tip of the fuel nozzle module into the inlet opening of the flame chamber.]

[55. The burner assembly of claim 54, wherein the oxygen-supply housing includes a hollow shell forming a boundary of the chamber means and the supporting means includes an aperture formed in the hollow shell and configured to receive the nozzle body therein and means for retaining the nozzle body in the aperture formed in the hollow shell so that the nozzle body is mounted inside the chamber means.]

[56. The burner assembly of claim 55, wherein the supporting means further includes means for holding the discharge tip in a fixed position in the inlet opening of the flame chamber.]

[57. The burner assembly of claim 51, wherein the oxygen-supply housing includes a base wall coupled to the hollow shell to define the chamber means therebetween and the holding means is coupled to the base wall.]

[58. The burner assembly of claim 54, wherein the fuel nozzle module includes means for conducting fuel through the nozzle body and discharging fuel at the discharge tip.]

[59. The burner assembly of claim 54, wherein the fuel nozzle module includes means for conducting separate streams of fuel and oxygen through the nozzle body and discharging an oxygen and fuel mixture using fuel and oxygen from the separate streams at the discharge tip.]

[60. A burner assembly comprising a burner block formed to include a flame chamber having an inlet opening and an outlet opening, and an oxygen-supply housing including a base wall and a hollow shell appended to the base wall to define an oxygen-supply chamber for receiving a supply of oxygen, the base wall being formed to include an oxygen-discharge aperture, the base wall being fixed to lie adjacent to the burner block to place the oxygen-discharge aperture in the base wall in fluid communication with the inlet opening in the burner block to allow oxygen to pass from the oxygen-supply chamber to the flame chamber through the oxygen-discharge aperture, the hollow shell having a pyramidal shape and a plurality of triangular side walls.]

[61. The burner assembly of claim 60, wherein each triangular side wall has a wide base end and a narrow tip end, and the narrow tip ends of the triangular side walls cooperate to define a nozzle-receiving aperture, and further comprising a fuel-discharge nozzle mounted in the nozzle-receiving aperture and arranged to discharge fuel into the flame chamber through the inlet opening in the burner block.]

[62. The burner assembly of claim 61, wherein the fuel-discharge nozzle is positioned to extend through the oxygen-discharge aperture formed in the base wall.]

[63. The burner assembly of claim 61, wherein the wide base of each triangular side wall is appended to the base wall.]

[64. The burner assembly of claim 61, further comprising a removable collar engaging the fuel-discharge nozzle and threadedly engaging a threaded rim appended to the narrow tip ends of the triangular side walls.]

[65. The burner assembly of claim 60, further comprising a connector coupled to the oxygen-supply housing and the burner block to mount the oxygen-supply housing on the burner block.]

[66. The burner assembly of claim 65, wherein the connector includes a frame positioned to lie between the base wall and the burner block and formed to include an oxygen-conductor passageway interconnecting the oxygen-discharge aperture formed in the base wall and the inlet opening formed in the burner block.]

[67. The burner assembly of claim 66, wherein the base wall is formed to include another oxygen-discharge aperture communicating with the oxygen-supply chamber, the burner block is formed to include an oxygen-conducting passageway having an outlet in the frame chamber and an inlet, and the frame is formed to include a bypass passageway interconnecting said another oxygen-discharge aperture formed in the base wall and said oxygen-conducting passageway formed in the burner block.]

[68. The burner assembly of claim 66, wherein the connector further includes at least one fastener coupled to the base wall and frame.]

*69. A burner assembly for combining oxygen and fuel to produce a flame, the burner assembly comprising*

*a burner block formed to include a flame chamber having an inlet opening and an outlet opening,*

*an oxygen-supply housing defining an oxygen chamber configured to receive a supply of oxygen and a base wall positioned to lie adjacent to the burner block, the base wall being formed to include an aperture positioned to lie in alignment with the inlet opening and to pass oxygen from the oxygen chamber into the flame chamber,*

*a fuel-discharge nozzle configured to discharge fuel,*

*a removable collar engaging the oxygen-supply housing and the fuel-discharge nozzle, the collar being formed to support the fuel-discharge nozzle within the inlet opening of the burner block to discharge fuel into the flame chamber formed in the burner block,*

*wherein the removable collar engages the fuel-discharge nozzle and threadedly engages the oxygen-supply housing, and*

*wherein the oxygen-supply housing includes an annular lip defining a cylindrical nozzle aperture receiving the nozzle and the removable collar includes an annular side wall surrounding and engaging the annular lip.*

*70. The burner assembly of claim 69, wherein the oxygen-supply housing includes a hollow shell that has a tip positioned to lie spaced apart from base wall and the removable collar engages the tip of the hollow shell and the fuel-discharge nozzle to retain the fuel-discharge nozzle in a fixed position within the hollow shell.*

*71. The burner assembly of claim 69, wherein the fuel-discharge nozzle includes a mounting fixture that selectively engages the collar and the fuel-discharge nozzle is removable from the oxygen-supply housing when the removable collar is disengaged from the mounting fixture.*

*72. The burner assembly of claim 71, wherein the fuel-discharge nozzle includes an inlet body portion, a central body portion, and a burner tip portion positioned to lie within the inlet opening of the burner block when the removable collar engages the mounting fixture and the oxygen-supply housing is in an installed position.*

*73. The burner assembly of claim 72, wherein the mounting fixture includes an outer end formed for engagement with the collar, an inner end facing the burner block, and a lip positioned to lie between the outer and inner ends and formed for engagement with the oxygen-supply housing when the collar is in the installed position.*

*74. The burner assembly of claim 71, wherein the mounting fixture includes an outer end formed for engagement with the collar, an inner end facing the burner block, and a lip positioned to lie between the outer and inner ends and formed for engagement with the oxygen-supply housing when the collar is in the installed position.*

*75. The burner assembly of claim 71, wherein the inlet opening of the burner block is defined by a wall and the burner tip portion is positioned to lie spaced-apart from the wall of the burner block when the collar is in the installed position.*

*76. A burner assembly for combining oxygen and fuel to produce a flame, the burner assembly comprising*

*a burner block formed to include a flame chamber having an inlet opening and an outlet opening,*

*an oxygen conductor conduit configured to conduct oxygen outside of the flame chamber to the outlet opening of the flame chamber,*

*an oxygen-supply housing defining an oxygen chamber configured to receive a supply of oxygen and a base wall positioned to lie adjacent to the burner block, the base wall being formed to include a first-stage aperture in alignment with the inlet opening to pass oxygen from the oxygen chamber into the flame chamber and a second-stage aperture arranged to lie in spaced-apart relation to the first-stage aperture to pass oxygen from the oxygen chamber into the oxygen conductor conduit,*

*a fuel-discharge nozzle extending the oxygen chamber and the first-stage aperture formed in the base wall to discharge fuel into the flame chamber,*

*further comprising a removable collar engaging the fuel-discharge nozzle and threadedly engaging the oxygen-supply housing, and*

*wherein the oxygen-supply housing includes an annular lip defining a cylindrical nozzle aperture receiving the fuel-discharge nozzle and the removable collar includes an annular side wall surrounding and engaging the annular lip.*

*77. The burner assembly of claim 76, wherein first-stage aperture is formed in the base wall, the second-stage aperture is formed in the base wall and arranged to lie in spaced-apart relation to the first-stage aperture, the oxygen conductor conduit includes at least one oxygen-conducting passageway formed in the burner block and arranged to receive oxygen conducted through a corresponding second-stage aperture, and the internal diameter of each second-stage aperture formed in the base wall is less than the internal diameter of a corresponding oxygen-conducting passageway formed in the burner block to regulate flow of oxygen through the oxygen-conducting passageways formed in the burner block.*

* * * * *